United States Patent
Sparck (12)

(10) Patent No.: US 10,584,271 B2
(45) Date of Patent: Mar. 10, 2020

(54) HEAT TRANSFER FLUID AND PROCESS FOR PREPARING SAME

(71) Applicant: ORG Chem Group, Evansville, IN (US)

(72) Inventor: Wayne Sparck, Evansville, IN (US)

(73) Assignee: ORG Chem Group, Evansville, IN (US)

( * ) Notice: Subject to any disclaimer, the term of this patent is extended or adjusted under 35 U.S.C. 154(b) by 0 days.

(21) Appl. No.: 15/385,366

(22) Filed: Dec. 20, 2016

(65) Prior Publication Data

US 2018/0171196 A1    Jun. 21, 2018

(51) Int. Cl.
| | | |
|---|---|---|
| *C09K 5/00* | (2006.01) | |
| *C09K 5/04* | (2006.01) | |
| *B01D 1/06* | (2006.01) | |
| *C09K 5/02* | (2006.01) | |
| *B01D 3/10* | (2006.01) | |
| *B01D 3/14* | (2006.01) | |
| *C09K 5/10* | (2006.01) | |

(52) U.S. Cl.
CPC .............. *C09K 5/048* (2013.01); *B01D 1/065* (2013.01); *B01D 3/10* (2013.01); *B01D 3/14* (2013.01); *C09K 5/02* (2013.01); *C09K 5/10* (2013.01)

(58) Field of Classification Search
None
See application file for complete search history.

(56) References Cited

U.S. PATENT DOCUMENTS

| | | | | |
|---|---|---|---|---|
| 4,230,536 A | * | 10/1980 | Sech .................... | B01D 1/0094 122/234 |
| 5,141,628 A | * | 8/1992 | Martin .................. | C10G 31/00 208/179 |
| 2001/0020117 A1 | * | 9/2001 | Mendoza ................ | C09K 5/10 585/24 |
| 2004/0031949 A1 | * | 2/2004 | Commandeur .......... | C09K 5/10 252/71 |
| 2006/0192172 A1 | * | 8/2006 | Sunkara .................. | C09K 5/10 252/73 |

FOREIGN PATENT DOCUMENTS

EP        0334830 A2 *   9/1989   ............... C09K 5/10

* cited by examiner

*Primary Examiner* — Necholus Ogden, Jr.
(74) *Attorney, Agent, or Firm* — Bushman Werner, P.C.

(57) ABSTRACT

A heat transfer fluid comprising about 20 to about 80% by weight terphenyls and from about 20 to about 80% by weight partially hydrogenated terphenyls, wherein preferably the terphenyls and partially hydrogenated terphenyls comprise a reclaimed product from a degraded heat transfer fluid initially comprised primarily of partially hydrogenated terphenyls.

11 Claims, No Drawings

HEAT TRANSFER FLUID AND PROCESS FOR PREPARING SAME

FIELD OF THE INVENTION

The present invention relates to high temperature thermal (heat transfer) fluids and a process for producing such fluids.

BACKGROUND OF THE INVENTION

Heat transfer fluids (also denoted as "thermal fluids") are widely used for temperature control in manufacturing facilities. The ability of a heat transfer fluid to resist degradation at elevated temperatures is referenced through a performance property denoted as "thermal stability". As a heat transfer fluid undergoes degradation, both volatile materials (which "boil" or evaporate from the fluid) and "heavy" materials (also denoted as "high boilers" or "residue") are formed within the heat transfer fluid. Such heavy components elevate the heat transfer fluid's viscosity and thereby lead to an increase in film temperature in the portion of heat transfer fluid denoted as the "film" which exists at the interface of the heat transfer fluid and a high temperature (respective to the temperature of the fluid) surface; any such differential in film temperature above the established maximum operating temperature of the heat transfer fluid augments the rate of degradation in the heat transfer fluid as a whole insofar as the film portion intermixes with the remainder of the heat transfer fluid. Further, tars or polymers formed through the degradation of a heat transfer fluid tend to darken the fluid and ultimately deposit on surfaces in the system; these deposits are detrimental to system efficiency and potentially lead to system failure. Significantly, degraded heat transfer fluid must, therefore, be periodically replaced with fresh or recycled heat transfer fluid.

Commonly used components of thermal fluids include partially hydrogenated terphenyls (PHTs) found for example in Therminol® 66 marketed by Eastman, and terphenyls, the primary component in Therminol® 75 also marketed by Eastman. Therminol® 66 also contains partially hydrogenated quaterphenyls while Therminol® 75 contains the same components and isomer ratios but in a non-hydrogenated form.

It is known that thermal fluids made primarily with terphenyls exhibit higher thermal stability than thermal fluids made with PHTs. However, thermal fluids made only with mixed terphenyls, such as Therminol® 75, suffer from the fact that they have a freezing point which prevents them from being introduced into a system without significant heating so as to make them fluid and pumpable. On the other hand, while PHTs such as used in Therminol® 66 provide a thermal fluid which is liquid and therefore pumpable at room temperature, e.g., 72° F. (22.2° C.), it suffers from the disadvantage that it has reduced thermal stability resulting from the saturated rings created from hydrogenation.

Regardless of whether the thermal fluid is terphenyl based or PHT based, the fluids are expensive. Over time, the thermal fluids degrade due to various reasons such as high temperatures. Degradation leads to the formation of light ends and tars. In the case of PHT based fluids, ultimately, they degrade to the point where significant amounts revert back to terphenyls along with generating tars and polymers. It is the formation of these tars and polymers which cause the viscosity to increase.

SUMMARY OF THE INVENTION

In one aspect, the present invention provides a thermal fluid which exhibits greater thermal stability in terms of the production of tars and polymer as compared with thermal fluids comprised only of PHTs.

In another aspect, the present invention provides a thermal fluid comprised at least in part of a product obtained by the distillation of a degraded PHT-based thermal fluid.

In a further aspect, the present invention provides a thermal fluid which is pumpable at room temperature, e.g., about 72° F. (22.2° C.).

In another aspect, the present invention provides a thermal fluid comprised of a mixture of terphenyls and PHTs which produces fewer light ends during usage.

In still a further aspect, the present invention provides a process for preparing a thermal fluid.

These and further features and advantages of the present invention will become apparent from the following detailed description, wherein reference is made to the figures in the accompanying drawings.

DETAILED DESCRIPTION OF PREFERRED EMBODIMENTS

While heat transfer fluids can be comprised of a variety of high boiling materials, two commonly used heat transfer fluids are Therminol® 66 marketed by Eastman and Therminol® 75 also marketed by Eastman. Therminol® 66 is comprised primarily of PHTs with lesser amounts of partially hydrogenated quaterphenyls. Therminol® 75 on the other hand is comprised primarily of terphenyls, with smaller amounts of quaterphenyls.

In particular, Therminol® 66 is widely used as a heat transfer fluid. As discussed above, over time heat transfer fluids such as Therminol® 66 degrade. The degradation results from a variety of causes including high fluid operating temperatures, rapid heating/cooling cycles, oxidation, etc. High operating temperatures and/or rapid heating/cooling cycles result in thermal cracking and decomposition of the fluids into tars and low boilers. There is also a buildup of polymers/tars which increases the solution viscosity. The low boilers decrease the flash point and therefore present a safety issue. Oxidation results in the formation of organic acids which can undergo free radical polymerization again increasing fluid viscosity and system deposits. Furthermore, the acids cause erosion with respect to operating equipment such as piping, pumps, valves, etc.

The PHTs, $C_6H_4(C_6H_5)(C_6H_{11})$ and $C_6H_4(C_6H_{11})_2$, as is well known to those skilled in the art, are a mixture of ortho-, meta-, and para-isomers. As they degrade as a result of time, temperature, and oxidation, they tend to produce a mixture of ortho-, meta-, and para-terphenyls as well as light ends, and tars including polymer. Typically the tars/polymer residue constitutes 15-50% by weight of a degraded fluid with high viscosity and concomitant pumping issues. The addition of makeup PHTs dilutes the tars/polymers but does not remove them. Replacing the entire degraded fluid with virgin fluid is expensive and furthermore requires an operational shutdown.

A typical degraded PHT-based thermal fluid which can be employed as a feed stock in the process of the present invention can comprise from about 50 to about 85% by weight of a mixture of terphenyls and partially hydrogenated terphenyls and from about 15 to about 50% by weight tars.

According to one embodiment of the process of the present invention, the degraded PHT-based thermal fluid is subjected to a short path distillation and wiped film evaporation process which produces (1) a product containing approximately 30-60% by weight terphenyls and about 30-60% by weight PHTs (collectively Recovered Product), (2) high boilers, and (3) light ends (if present), with the latter two being discarded. The Recovered Product, in and of itself, is an excellent thermal fluid according to one embodiment of the present invention. Another thermal fluid in accordance with the present invention can be obtained by back mixing Recovered Product with virgin PHTs to produce a heat transfer fluid containing from about 20 to about 80% by weight, preferably from about 60 to about 70% by weight, Recovered Product, and from about 30 to about 70% by weight, preferably from about 30 to about 40% by weight, added PHTs. The heat transfer fluid of the present invention can, in addition, contain from 0 up to about 30% partially hydrogenated quaterphenyls, from about 0 up to about 30% quaterphenyl, and from about 0 up to about 10% phenanthrene. The resulting, unique heat transfer fluid has increased thermal stability requiring less frequent maintenance shut downs, is less costly than a virgin fluid (since the portion containing the terphenyls has been reclaimed and reused), results in the formation of less tars, and is environmentally friendly since there is less waste generated and as well as a required need for raw (virgin) materials.

In conducting the process, the following conditions are generally employed:
- under vacuum at a pressure from about 0.1 to about 200 mmHg
- temperatures from about 200 to about 600° F. (315° C.);
- feed rates from about 1 to about 1000 pounds/minute.

To demonstrate the process of the present invention, a laboratory, wiped film and short path distillation evaporator of the Pope type was employed.

EXAMPLE 258.0 grams of degraded Therminol® 66 was introduced into the evaporator under the following conditions:

under vacuum at a pressure of 5 mmHg;
temperature 390° F. (199° C.);
feed rate 2.8 grams/minute.

The process produced 157.8 grams of the desired Recovered Product which was comprised primarily of ortho-, meta-, and para-terphenyls and PHTs. There was also recovered 80.2 grams of a residue comprised of tars. To the Recovered Product was added 102.2 grams of PHTs. The resulting heat transfer fluid (T-660XL) was a slurry at room temperature which became free flowing when agitated. While the T-660XL settles into two layers, as noted, a free-flowing slurry is easily obtained by shaking or mixing.

It was found that the slurry could be pumped at room temperature and all solids dissolved if the T-660XL was heated to 160° F. (71.1° C.).

The T-660XL produced according to the present invention can be used at temperatures less than 653° F. (345° C.) and degrades at a much slower rate due to the presence of the terphenyls. The T-660XL, when in use, produces less tars as compared to a heat transfer fluid comprised entirely of PHTs, e.g., Therminol® 66. Since the T-660XL comprises a significant amount of material reclaimed from degraded Therminol® 66 fluid, there is a significant cost savings. As noted, the only materials sent to waste are the tars and a minimal amount of light ends.

Although as described above, the T-660XL of the present invention can be produced using Recovered Product from a reclaiming process which recovers a significant amount of terphenyls/PHTs from a degraded heat transfer fluid such as Therminol® 66, it will be appreciated that the unique heat transfer fluid of the present invention can also be produced by admixing virgin terphenyls with virgin PHTs in the amounts specified above. However, T-660XL produced, at least partially by reclamation, has peripheral benefits as noted above.

In general, the thermal fluid of the present invention regardless of whether it incorporates Recovered Product alone or in admixture with other components, or employs virgin terphenyls and virgin PHTs, will contain from about 20 to about 80% by weight terphenyls and from about 20% to about 80% by weight PHTs.

The table below shows a comparison of the properties of the T-660XL (the fluid of the present invention) as compared with Therminol® 66.

|   | T-660XL | Therminol ® 66 |
| --- | --- | --- |
| Bulk Temperature Range | 100-653° F. (38-345° C.) | 32-653° F. (0-345° C.) |
| Maximum Film Temperature | 698° F. (370° C.) | 698° F. (370° C.) |
| Boiling Range @ 760 mmHg | 665° F. (352° C.) | 665° F. (352° C.) |
| Composition | Mix of terphenyls and hydrogenated terphenyls | Mix of hydrogenated terphenyls |
| Average Molecular Mass | 245 | 252 |
| Flash Point, COC | 374° F. (190° C.) | 374° F. (190° C.) |
| Kinematic Viscosity @ 100 C, Cs | 3.75 | 3.6 |
| Kinematic Viscosity @ 300 C, Cs | 0.55 | 0.50 |
| Density @ 25° C., lbs/gal | 8.45 | 8.38 |
| Specific Gravity @ 25° C. | 1.020 | 1.008 |
| Moisture Content | <150 | <150 |
| TAN | <0.10 | <0.10 |
| Appearance | Yellow | Light Yellow |

As described above, a preferred process for preparing the heat transfer fluid of the present invention is by reclaiming or recovering a product comprised mainly of terphenyls and recovered PHTs from a degraded heat transfer fluid initially made from PHTs by wiped film and short path distillation. In this regard, equipment for performing such reclamation processes are readily available from companies such as Pope Scientific Inc., Pfaudler-US, Inc. Buss-SMS GmbH, as well as other manufacturers.

It will also be appreciated that while the use of wiped film still technology is a preferred way of reclaiming the terphenyls from degraded heat transfer fluids, other distillation techniques can be employed, provided care is taken to avoid excess heating which could cause further degradation and hence lower recovery of the terphenyls from the degraded heat transfer fluid. These processes employing flash evaporators, falling film stills, rotary evaporators and similar equipment might be used under carefully controlled temperature and pressure conditions. Thus, although other distillation techniques could be employed, care must be taken to avoid excess heating which minimizes the yield of terphenyls from the degraded heat transfer fluid.

Although specific embodiments of the invention have been described herein in some detail, this has been done solely for the purposes of explaining the various aspects of the invention, and is not intended to limit the scope of the invention as defined in the claims which follow. Those skilled in the art will understand that the embodiment shown and described is exemplary, and various other substitutions, alterations and modifications, including but not limited to those design alternatives specifically discussed herein, may be made in the practice of the invention without departing from its scope.

What is claimed is:

1. A heat transfer fluid comprising:
   from about 20 to about 80% by weight terphenyls;
   from about 20 to about 80% by weight partially hydrogenated terphenyls; and
   a recovered product containing from about 30 to about 60% by weight terphenyls and from about 30 to about 60% by weight partially hydrogenated terphenyls, wherein said recovered product is obtained from a degraded partially hydrogenated terphenyl-based heat transfer fluid.

2. The heat transfer fluid of claim 1, further comprising:
   from about 0 to less than about 30% by weight partially hydrogenated quaterphenyls;
   from about 0 to less than about 30% by weight quaterphenyls; and
   from about 0 to less than about 10% by weight phenanthrene.

3. The heat transfer fluid of claim 1, wherein said recovered product is reclaimed from said degraded partially hydrogenated terphenyl-based heat transfer fluid by distillation.

4. The heat transfer fluid of claim 3, wherein said distillation process comprises a short path distillation and wiped film evaporation process.

5. The heat transfer fluid of claim 3, wherein said degraded partially hydrogenated terphenyl-based heat transfer fluid comprises from about 50% to about 85% by weight of a mixture of terphenyls and partially hydrogenated terphenyls and from about 15 to about 50% by weight tars.

6. A process for making a heat transfer fluid, comprising:
   providing a short path, wiped film evaporator;
   introducing into said evaporator, a composition comprising a degraded, partially hydrogenated terphenyl heat transfer liquid, said degraded heat transfer liquid containing from about 50 to about 85% by weight of a mixture of terphenyls and partially hydrogenated terphenyls and from about 15 to about 50% by weight tars; and
   distilling said degraded heat transfer liquid to produce a recovered product containing from about 30 to about 60% by weight terphenyls and from about 30 to about 60% by weight partially hydrogenated terphenyls.

7. The process of claim 6, further comprising adding to said recovered product virgin partially hydrogenated terphenyls in an amount of from about 20 to about 70% by weight based on the combined weight of the recovered product and virgin partially hydrogenated terphenyls to produce a heat transfer fluid capable of operating temperatures up to about 653° F. (345° C.).

8. The process of claim 6, wherein said distillation is conducted under vacuum at a pressure of about 0.1 to 200 mmHg.

9. The process of claim 6, wherein said distillation is conducted at a temperature of from about 200 to about 600° F. (315° C.).

10. The process of claim 6, wherein said distillation is conducted at a feed rate of from about 1 to about 1000 pounds/minute.

11. A process for making a heat transfer fluid, comprising:
    subjecting a composition of a degraded, partially hydrogenated terphenyl heat transfer fluid containing a mixture comprising (a) from about 50 to about 85% by weight of a mixture of terphenyls and partially hydrogenated terphenyls, and (b) from about 15 to about 50% by weight tars, to a distillation process conducted under conditions of pressure, temperature, and residence time, which minimize degradation of the partially hydrogenated terphenyls;
    recovering a product comprising from about 30 to about 60% by weight containing terphenyls and from about 30 to about 60% by weight partially hydrogenated terphenyls; and
    adding to said recovered product virgin partially hydrogenated terphenyls in an amount of from about 20 to about 70% by weight based on the combined weight of said recovered product and said virgin partially hydrogenated terphenyls to produce a heat transfer fluid capable of operating temperatures up to about 653° F. (345° C.).

* * * * *